Jan. 27, 1970     R. KELLER     3,491,619

FLUID FLOW TRANSMISSION

Filed Aug. 7, 1967     2 Sheets-Sheet 1

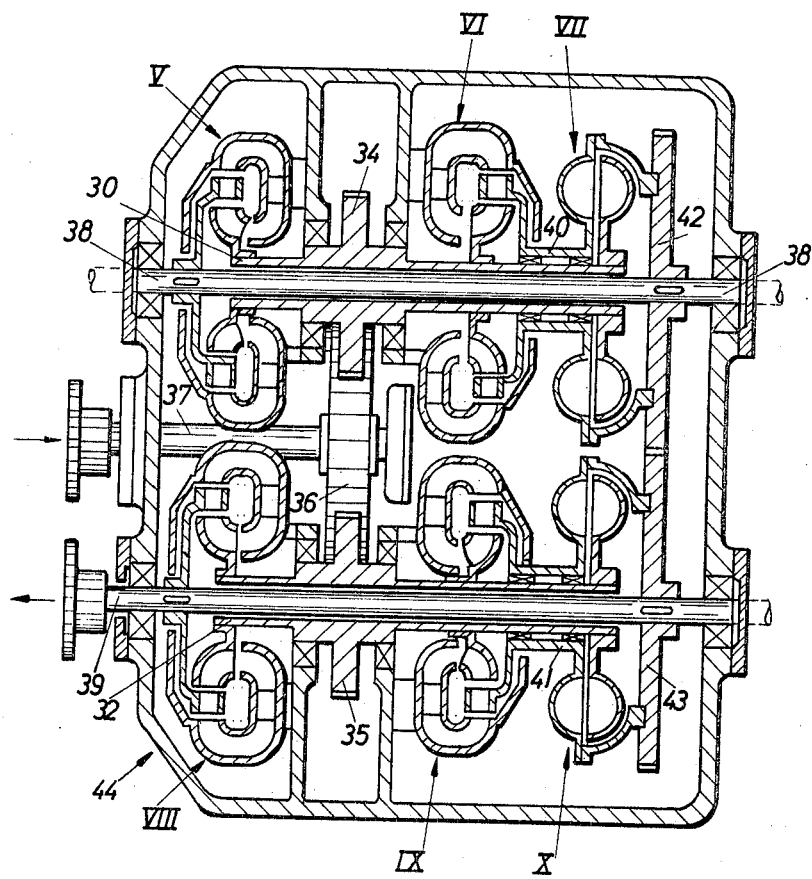

United States Patent Office 3,491,619
Patented Jan. 27, 1970

3,491,619
FLUID FLOW TRANSMISSION
Rolf Keller, Heidenheim (Brenz), Germany, assignor to Voith Getriebe KG, Heidenheim (Brenz), Germany
Filed Aug. 7, 1967, Ser. No. 658,908
Claims priority, application Germany, Aug. 13, 1966, 1,605,022
Int. Cl. F16h 47/00
U.S. Cl. 74—718                                     2 Claims

ABSTRACT OF THE DISCLOSURE

Transmission having an input shaft and an output shaft with two units in parallel relation interposed between the shafts and with each unit having coaxial fluid flow devices adapted to be made effective and ineffective by filling and emptying and with gearing connecting the shafts with the units so that reversible rotation of the output shaft is had by emptying and filling the devices without the use of clutches.

---

The present invention relates to a fluid flow transmission. With fluid flow transmissions in self-propelled railway vehicles which for each velocity in each of the two driving directions have a separate fluid circuit (fluid flow converter or, in certain instances, a fluid coupling)—with two velocities in each driving direction a total of four fluid circuits—it is merely necessary for changing the velocities and the driving direction to fill and empty the respective fluid circuits. In order to reduce the number of the fluid flow circuits by 50%, arrangements have been provided according to which the fluid transmission is followed by a mechanical transmission. With such a design, the actuation of the mechanical transmission clutches represents a certain problem. More specifically, care has to be taken to prevent a switch-over during the drive. This in turn eliminates the possibility, by filling the fluid circuit for the other driving direction, to speed up the driving change during the drive.

It is for this reason that it has been suggested to provide a separate fluid flow circuit each for the lower velocity range of each driving direction. With such a transmission design, however, it is necessary to provide change gear clutches for the change in the driving direction during driving operation. Such clutches are expensive from a manufacturing standpoint and also as to their operation and furthermore are subjected to considerable wear which may cause disorders and corresponding high service costs. Such drawbacks are of increased importance nowadays so that it has become expedient to resort again to the first mentioned transmission design. This is all the more justified inasmuch as nowadays the transmissions can be equipped with newly developed fluid flow circuits of which in many instances two will completely suffice in each driving direction for the entire velocity range durding long distance operations. Thus, it is possible to get by with a total of four fluid flow circuits. This number is in view of the losses of the idling fluid flow circuits economically feasible while these losses can even be further reduced.

However, inasmuch as these transmissions, with regard to the design for higher and higher outputs, have less and less space available, the placing of purely hydraulic transmissions in the available space encounters greater and greater difficulties. The previously known transmission designs of fully hydraulic reversible transmissions, namely the arrangement of the fluid flow circuits separate according to driving directions on or adjacent the respective driving axles, can, with the modern driving outputs, not be realized any longer already for the reason that all axles have to be driven simultaneously. Nowadays, only compact fluid flow transmissions can be used of the type with succeeding mechanical change gear transmissions.

It is, therefore, an object of the present invention to provide a fully hydraulic reversible transmission of a compact design.

It is another object of this invention to provide a transmission as set forth in the preceding paragraph, which may be composed of two completely identical transmission groups.

These and other objects and advantages of the invention will appear more clearly from the following specification in connection with the accompanying drawings, in which:

FIG. 2 is a horizontal section through a fluid flow reversible transmission with six fluid flow circiuts and, more specifically, with two differently bladed converters each and a coupling, with central turbine wheel shafts and with input and output shaft arranged on the same side of the transmission.

Figure 1:
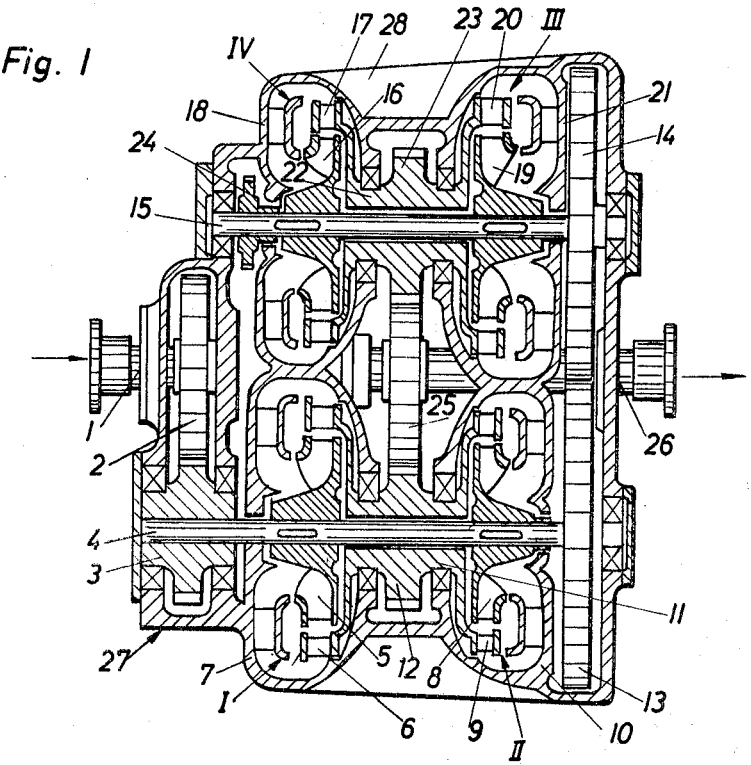
FIG. 1 is a horizontal section through a fluid flow reversible transmission according to the present invention with two fully identical transmission groups, each comprising two fluid flow converters, with a central pump wheel shaft and aligned input and output shaft.

Starting from a fluid flow transmission, for instance of the type illustrated in FIG. 13 of German Patent No. 661,783, with a separate fluid circuit for each velocity range, preferably for two velocity ranges, in each of the two driving directions while the fluid flow circiuts are arranged separately in conformity with the driving direction in two coaxial and parallel transmission groups, it is suggested to arrange both parallel axial transmission groups directly adjacent to each other and to connect their pump wheel shafts to each other and to a common input shaft through a spur wheel train while connecting the turbine wheel shafts to each other and to a common output shaft through a further spur wheel train, and to house these elements in a common transmission housing. One of said spur wheel trains has an even number of spur gears, for instance two, whereas the other one has an uneven number of spur gears, for instance three. This arrangement of the fluid flow circuits and of the required additional elements makes possible a block-like space-saving design of the transmission so that a universal mounting and an arrangement of the input shaft and output shaft in conformity with the requirements can easily be realized.

According to one embodiment of the transmission according to the present invention, each of the two transmission groups comprises a central primary shaft and a common hollow secondary shaft while the two central primary shafts are at one end interconnected by a pair of spur gears, whereas the other two secondary shafts are interconnected by three spur gears arranged between two fluid flow circuits of each transmission group, the intermediate spur gear being mounted on the common output shaft. Advantageously, the mentioned gear pair may be arranged on that side of the transmission which faces away from the drive or the motor, whereas a further pair of gears with a step-up transmission may be arranged at that side which faces the drive.

According to another similar design, the pump wheel shafts may form a common hollow shaft and the turbine wheel shafts may be designed as central shafts. In such an instance, the central secondary shafts are connected at one end thereof by a pair of spur gears, whereas the primary hollow shafts are interconnected by the three spur gears located between two fluid flow circuits of each transmission group.

According to a further development of the present invention, with a design comprising two fluid flow converters for each transmission group, the latter are arranged in such axial distance with regard to each other that the guide wheel housing of the two fluid flow converters adjacent to each other in radial direction will have a common partition. Such a design greatly increases the stability of the transmission housing at low weight of the latter, and even when a separating gap of the transmission housing extends between the axles of both transmission groups. It is furthermore highly advantageous to design the guide wheel housing together with the transmission housing as a single work piece.

A further development of the present invention is based on the fact that in most instances the fluid flow circuit for a higher velocity range has a shorter diameter than the fluid flow circuit for a lower velocity range. If now, in accordance with this further development of the invention, for instance with transmission groups with two fluid flow circuits each, the fluid flow circuit for the lower velocity range of one transmission group and the fluid flow circuit for the higher velocity range of the other transmission group are arranged on one transmission side and the other fluid flow circuits are arranged on the other transmission side, it will be appreciated that one larger and one smaller fluid flow circuit will be located adjacent to each other so that the two transmission groups will have their axles closer to each other whereas the dimensions of the total transmission can be considerably reduced.

Particular important advantages with regard to the manufacturing process are obtained when the two transmission groups with one larger and one smaller fluid flow circuit each are arranged on alternate sides while their primary shafts are coupled to each other in such a way that both are driven in the same relative direction of rotation. In other words, the pump wheels of the fluid circuits for the first forward velocity range and for the first rearward velocity range are driven in clockwise direction when looking toward the suction side of the runner. In this way, there is obtained the further advantage that two completely identical transmission groups can be employed.

Referring now to the drawings in detail and FIG. 1 thereof in particular, the drive shaft 1 through two spur gears 2 and 3 drives the central pump wheel shaft 4 equipped with the pump wheels 5 and 8 of the two fluid flow converters I and II. The two turbine wheels 6 and 9 are rigidly connected to each other through the intervention of a hollow shaft 11 having a spur gear 12 connected thereto. The central pump wheel shaft 4 is through two spur gears 13 and 14 drivingly connected to a second central pump wheel shaft 15 which, in addition to a spur gear 24 for the filling pump drive, also has connected thereto the pump wheels 16 and 19 of the fluid flow converters III and IV. The turbine wheels 17 and 20 of said last mentioned two converters are rigidly connected to a spur gear 23 through the intervention of a hollow shaft 22. The two spur gears 12 and 23 on the hollow turbine wheel shafts 11 and 22 mesh with the spur gear 25 connected to the output drive shaft 26.

Inasmuch as the two pump wheel shafts 4 and 15 are driven in opposite direction with regard to each other, while the two turbine wheel shafts 11 and 22 are connected to the output shaft 26 in the same sense of rotation, the two coaxially arranged converters I and II of one group bring about the forward drive, and the two coaxially arranged converters III and IV of the other group bring about the rearward drive. The converters I and III are filled for the lower velocity range (starting converter) and the converters II and IV are filled for the higher velocity range (normal drive converter), the respective other converters are being empty in these circumstances.

A mechanical clutch is no longer necessary. As will be evident from FIG. 1, the transmission forms a compact transmission block with a common housing 27. Due to the fact that each time a starting and a normal drive converter, namely the converters I and IV and the converters II and III, are directly adjacent in radial direction, a minimum space between the two pump wheel shafts 4 and 5 is obtained and thereby also a minimum spacing between the two transmission groups I/II and III/IV. The blade wheels of the converter I are completely identical to the blade wheels of the converter III. Similarly, the converters II and IV are completely identical to each other. The transmission housing 27 has two parallel separating gaps. One of these gaps is located in the drawing plane, whereas the other gap extends through the aligned input and output shafts 1 and 26 respectively.

The illustrated basic design also permits other arrangements of the input shaft and output shaft. Thus, for instance, the input shaft with the spur gear 2 may be located in front of the drawing plane and the output shaft 26 may be located therebehind. Furthermore, control elements may be provided at 28 and 29 of the transmission housing 27.

The transmission illustrated in FIG. 2 has four fluid flow converters V, VI, VIII and IX and furthermore has two fluid flow couplings VII and X. The two converters V and VI and the coupling VII are filled for the forward drive and the remaining converters are filled for the rearward drive. In the lower velocity range, the converters VII and VIII are engaged, whereas in the intermediate velocity range the converters V and IX are engaged. In the other velocity ranges, the fluid flow couplings VII and X are engaged. In contrast to the transmission shown in FIG. 1, according to FIG. 2, for each three coaxial fluid flow circuits V to VII and VIII to X, common hollow pump wheel shafts 30 and 32 respectively are provided to which the pump wheels of the respective three fluid flow circuits are connected. The pump wheel shafts each have connected thereto a spur gear 34, 35 which both mesh with a spur gear 36 connected to the drive shaft 37. The turbine wheel shafts form central shafts 38 and 39 extending all the way through the transmission. The ends of said shafts 38, 39 have connected thereto a turbine wheel of the respective outer fluid flow transmission V, VII, VIII and X. The turbine wheels of the fluid flow circuits VI and VII; IX and X are rigidly interconnected through the intervention of hollow shafts 40 and 41.

Furthermore, both central turbine wheel shafts 38 and 39 are drivingly interconnected through two spur gears 42 and 43. The two directions of rotation of the output shaft 39 are realized by the fact that the transmission groups V/VI/VII and VIII/IX/X are driven in the same direction, but differ in their output driving direction.

According to FIG. 2, the left end of the turbine wheel shaft 39 serves as output shaft. As mentioned above, if desired, also the other end of this shaft and one of the two ends of the other turbine shaft 38 may extend outwardly through the housing 44 and may be used as output shaft. Furthermore, shaft 38 or 39 may through gears be connected with an output shaft arranged at another spot.

Figure 3:
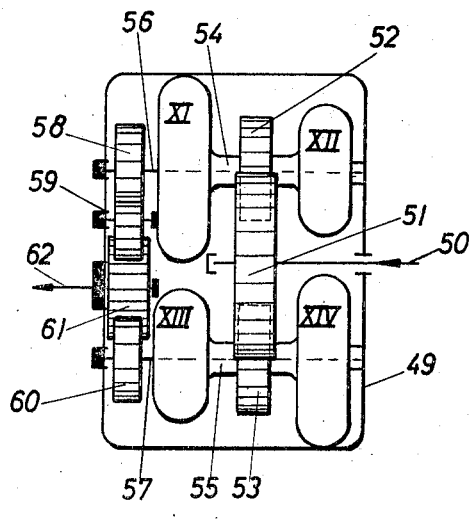
FIG. 3 is a top view of a four converter transmission with central turbine wheel shafts and with the output shaft located below the input shaft.

The modification illustrated in FIG. 3 has four fluid flow converters XI, XII, XIII and XIV in one transmission housing 49 the pump wheels of which are by the input shaft 50 through the intervention of gears 51 to 53 driven in the same direction as the hollow pump wheel shafts 54 and 55. The drive is effected through the central turbines shafts 56 and 57 and the gears 58 to 61 to the output shaft 52 which is located at a lower level than the input shaft 50. This modification will, similar to FIG. 1, make it possible with only seven gears to bring about a step-up drive of the converter and a step-down drive toward the shaft 62 while the location of the input shaft 50 and the output shaft 62 with only two gear wheel planes will meet all practical requirements including a good use of the available space.

It is, of course, to be understood that the present invention is, by no means, limited to the particular embodiments shown in the drawings, but also comprises any modifications within the scope of the appended claims. It may also be emphasized that the employment of the fluid flow transmission according to the invention is not limited to vehicles, but is advantageous wherever a fluid flow transmission is employed which has to meet the requirement that both output driving directions must be possible without mechanical reversing shifting operations.

What is claimed is:

1. A fluid flow transmission, expecially for rail vehicles comprising: an input drive shaft, an output drive shaft, a fluid flow transmission unit for each direction of rotation of the output shaft interposed between the input shaft and the output shaft, said units being in parallel adjacent relation, each unit having at least two coaxially arranged fluid flow devices each with a pumping wheel and a turbine wheel and each device being adapted to be made selectively effective and ineffective by respectively emptying or filling the respective device and each said unit having a lower velocity range device and a higher velocity range device, the devices of one unit being identical with those of the other unit, the devices of said units being in respectively reverse order in axial direction with respect to complementary compact spaced relationship adjacent to each other, each flow transmission unit having one device with a smaller diameter and having another device with a larger diameter, first shaft means interconnecting the pumping wheels of each unit, second shaft means interconnecting the turbine wheels of each unit, first means connecting said input shaft to the respective said first shaft means, second means connecting said output drive shaft to the respective said second shaft means, said first and second means comprising gears which with one and the same direction of rotation of said input drive shaft provide for one direction of rotation of said output shaft when one of said units is effective due to at least one of its devices being filled while the devices of the other unit are empty and the opposite direction of rotation of said output shaft when the other of said units is effective due to at least one of its devices being filled while the devices of said one unit are empty, said gears comprising speed gear trains connecting one of said drive shafts to each of one of said shaft means with some of said trains having an even number of gears therein and others of said trains having an odd number of gears therein and also comprising a gear fixed on each of the other shaft means between the two coaxially arranged devices and engaging a gear fixed on the other of said drive shafts, said devices being so arranged in the units and the units being so aligned that each smaller diameter device of each unit is readily aligned with respect to the larger diameter device of the other unit.

2. A fluid flow transmission according to claim 1, in which each of said other shaft means is hollow with each of said one shaft means extending therethrough and said gear on the other shaft means surrounding said hollow shaft means.

References Cited

UNITED STATES PATENTS

| | | | |
|---|---|---|---|
| 2,142,269 | 1/1939 | Gossler | 74—720 X |
| 2,213,349 | 9/1940 | Seibold | 74—720 X |
| 2,568,275 | 9/1951 | Dahlstrand et al. | 74—720 X |
| 3,169,371 | 2/1965 | Kugel | 74—720 X |
| 3,176,544 | 4/1965 | Baumeister | 74—732 |
| 3,373,634 | 3/1968 | Schrag | 74—730 X |
| 3,383,951 | 5/1968 | Morrow | 74—718 |

FOREIGN PATENTS

| | | |
|---|---|---|
| 891,638 | 12/1943 | France. |
| 992,734 | 6/1951 | France. |
| 238,021 | 9/1945 | Switzerland. |

DONLEY J. STOCKING, Primary Examiner

THOMAS C. PERRY, Assistant Examiner

U.S. Cl. X.R.

74—720